3,271,406
SUBSTITUTED-HYDRAZINO BENZISOTHIAZOLES
John J. Traverso and Calvert W. Whitehead, Indianapolis, Ind., assignors to Eli Lilly and Company, Indianapolis, Ind., a corporation of Indiana
No Drawing. Filed Oct. 11, 1965, Ser. No. 494,915
6 Claims. (Cl. 260—301)

This invention relates to certain novel 3-(substituted-hydrazino)-1,2-benzisothiazole 1,1-dioxides and to methods for their preparation.

The instant novel compounds are different structurally from the benzisothiazoles disclosed in the prior art. For example, 3-butylamino-1,2-benzisothiazole, 1,1-dioxide is reported to possess blood sugar-lowering properties [McLamore and Laubach, Compt. rend. cong. intern. Chim. ind., 31e, Liege, 1958; Chem. Abs., 54, 5960 (1960)]. Another compound, 5-chloro-1,2-benzisothiazolin-3-one, is reported to be effective in the control of algae, bacteria, and fungi [British Patent 844,541 (December 13, 1961)]. The 1,2-benzisothiazolones such as 2-γ-dimethylaminopropyl-1,2-benzisothiazolone, taught in Belgian Patent 617,384 (November 8, 1962), possess anti-inflammatory properties. However, substituted 1,2-benzisothiazole 1,1-dioxides of the type herein disclosed and possessing the new and unexpected utilities herein described have not previously been known. These novel compounds have highly useful and unexpected properties as hypotensive agents.

A primary object of this invention is to provide novel 1,2-benzisothiazole 1,1-dioxides which differ in structure from prior-art compounds. Another object is to provide processess for the preparation of the novel compounds. These and other objects of this invention are more fully described hereinafter.

The novel 1,2-benzisothiazole 1,1-dioxides of this invention are represented by the following general formula:

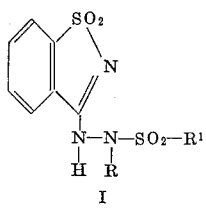

I wherein

R is hydrogen, lower alkyl, or lower alkenyl; and
$R^1$ is lower alkyl, phenyl, α-naphthyl, or β-naphthyl.

While compounds of the present invention have been defined in terms of a structural formula which depicts the novel structural features of the claimed compounds and which indicates the presence therein of certain well-known organic radicals, including alkyl, phenyl, and naphthyl, as well as a fused-ring structure including the well-known benzo moiety, it will be recognized by those skilled in the art that such organic moieties may bear one or more substituents without departing in any way from the spirit of the invention and without altering the properties of the novel compounds in such a way as would set them apart from the invention or take them outside its scope. Compounds having the novel structure of the present invention and bearing such substituents are accordingly to be considered as equivalents of the unsubstituted compounds and are to be considered to lie within the scope of the invention. Among such substituent atoms and radicals are halo, lower alkyl, lower alkenyl, trifluoromethyl, lower alkoxy, nitro, and sulfamyl.

Lower alkyl refers to methyl, ethyl, n-propyl, or isopropyl.

Lower alkenyl refers to vinyl or allyl.

Compounds coming within the scope of the invention include the following:

3-(2-p-bromobenzenesulfonylhydrazino)-1,2-benzisothiazole 1,1-dioxide
3-(2-methylsulfonylhydrazino)-1,2-benzisothiazole 1,1-dioxide
3-[2-ethyl-2-(benzenesulfonyl)hydrazino]-1,2-benzisothiazole 1,1-dioxide
3-[2-methyl-2-(methylsulfonyl)hydrazino]-1,2-benzisothiazole 1,1-dioxide
3-[2-ethyl-2-(p-chlorobenzenesulfonyl)hydrazino]-1,2-benzisothiazole, 1,1-dioxide
3-[2-allyl-2-(n-propylsulfonyl)hydrazino]-1,2-benzisothiazole 1,1-dioxide
3-[2-ethyl-2-(ethylsulfonyl)hydrazino]-1,2-benzisothiazole, 1,1-dioxide
3-[2-n-propyl-2-(p-toluenesulfonyl)hydrazino]-1,2-benzisothiazole 1,1-dioxide
3-[2-ethylsulfonylhydrazino)-1,2-benzisothiazole]-1,1-dioxide
3-[2-vinyl-2-(benzenesulfonyl)hydrazino]-1,2-benzisothiazole 1,1-dioxide
6-chloro-3-(2-p-bromobenzenesulfonylhydrazino)-1,2-benzisothiazole 1,1-dioxide
6-chloro-3-[2-ethyl-2-(p-toluenesulfonyl)hydrazino]-1,2-benzisothiazole 1,1-dioxide
6 - bromo - 3 - [2 - methyl - 2 - (benzenesulfonyl)hydrazino] - 1,2 - benzisothiazole 1,1 - dioxide, and the like.

From the above description and examples, it will be apparent that the novel 1,2-benzisothiazole 1,1-dioxides of this invention are markedly different in structure from the prior-art compounds. The compounds of this invention have a mono-substituted hydrazino moiety or a di-substituted hydrazino moiety attached at the 3 position of the benzisothiazole nucleus.

The above-described structural differences result in a most unusual series of compounds, a series which exhibits significant hypotensive activity.

The active compounds of this invention can be administered in a form adapted for oral or parenteral administration, oral administration being especially preferred because of the ease and convenience associated therewith. Thus, the compositions can be prepared in the form of a compressed tablet or a filled capsule, as well as in the form of a solution or suspension suitable for oral or intramuscular administration.

The novel compounds of this invention show intersecting hypotensive activity when administered orally or i.v. to rats made hypertensive by the well-known Goldblatt method. A dose of 20 mg./kg. orally for 5 days causes a significant lowering of the blood pressure in the test animals. Equally significant blood pressure lowering is accomplished by administering the compounds in doses of 10–12 mg./kg. i.v., the effect on the blood pressure of the Goldblatt rats being cumulative and independent of the method of adminstration.

The novel compounds of this invention are conveniently prepared utilizing as one of the starting reagents a 3-hydrazino-1,2-benzisothiazole 1,1-dioxide represented by the following formula:

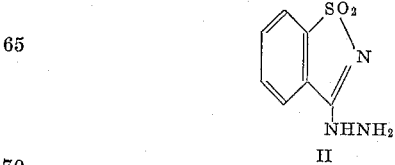

II or an appropriately substituted variant thereof. These starting reagents are readily prepared by known methods.

The 3 - (substituted-hydrazino)benzisothiazole compounds of this invention (Formula I hereinabove) can be prepared by commingling the starting 3-hydrazino-1,2-benzisothiazole 1,1-dioxide with an appropriate sulfonyl halide compound, and a base to pick up the acid formed, in a mutual solvent such as water, pyridine, ethanol, or a mixture of water and ethanol, and warming the reaction mixture to a temperature in the range of about ambient room temperature to about 100° C., suitably around 40–100° C., for a period of time sufficient to produce a substantial yield of the desired condensation product. Where pyridine is used as solvent, no additional base is needed to act as an acid acceptor. The reaction product mixture is worked up by first concentrating it in vacuo to about one-half its original volume. The solid material which separates is filtered off and recrystallized from a suitable solvent such as methanol, ethanol, or in some cases, water, or mixtures of water and ethanol or methanol, to yield the desired 3-(substituted-hydrazino)benzisothiazole 1,1-dioxide.

Those compounds of the invention wherein the hydrazino moiety is disubstituted can be readily prepared by alkylating a 3-(substituted-hydrazino)-1,2-benzisothiazole 1,1-dioxide, supra, using methods well known to the art. The reaction is carried out, for example, by commingling a 3-(substituted-hydrazino)-1,2-benzisothiazole 1,1-dioxide and a lower alkyl halide or a lower alkenyl halide in a suitable solvent in the presence of a base and heating for about 1 to 4 hours, suitably for about 2 to 3 hours, whereby the 3-[2-lower alkyl (or 2-lower alkenyl) 2-arylsulfonylhydrazino]-1,2-benzisothiazole 1,1-dioxide is produced. Solvents which can be used include water and water-alcohol mixtures. Suitable alkylating agents include methyl iodide, methyl bromide, dimethyl sulfate, ethyl iodide, ethyl bromide, allyl bromide, n-propyl bromide, and the like. The reaction product mixture is worked up by cooling and acidifying it with a dilute aqueous acid such as dilute aqueous hydrochloric acid, whereby the product is precipitated and is filtered off.

That the invention may be more easily comprehended, examples of these syntheses of compounds coming within the scope of the invention are given hereinbelow.

EXAMPLE 1

*3-(2-benzenesulfonylhydrazino)-1,2-benzisothiazole 1,1-dioxide*

To an efficiently stirred solution composed of 19.7 g. (0.10 mole) of 3-hydrazino-1,2-benzisothiazole 1,1-dioxide, 4 g. (0.10 mole) of sodium hydroxide, and 500 ml. of water, were added rapidly at room temperature 18 g. (0.10 mole) of benzenesulfonyl chloride. Stirring was continued until the originally basic reaction mixture gave a neutral-to-acidic response to acid-base test paper. During this time, beginning at 15 to 20 minutes from the start of the reaction, solid material began to separate out. This material was filtered off, washed with about 50 ml. of water, and air dried. It weighed 31 g. (92 percent of theory), and was identified as 3-(2-benzenesulfonylhydrazino)-1,2-benzisothiazole 1,1-dioxide monohydrate having a melting point of about 128° C. after recrystallization from water.

*Analysis.*—Calcd.: C, 44.00; H, 3.69; N, 11.84. Found: C, 44.12; H, 3.75; N, 11.89.

EXAMPLE 2

*3-(2-p-toluenesulfonylhydrazino)-1,2-benzisothiazole 1,1-dioxide*

To a solution composed of 19.7 g. (0.10 mole) of 3-hydrazino-1,2-benzisothiazole 1,1-dioxide, 4 g. (0.10 mole) of sodium hydroxide, and 500 ml. of a 50:50 ethanol-water mixture warmed on a steam bath, were added rapidly 19 g. (0.10 mole) of p-toluenesulfonyl chloride. Heating was continued until the originally basic reaction mixture gave a neutral-to-acidic response to acid-base test paper. The reaction product mixture was concentrated to about one-third its original volume by boiling on the steam bath at atmospheric pressure. The solid material which separated was filtered off and washed with about 50 ml. of water. It was identified as 3-(2-p-toluenesulfonylhydrazino)-1,2-benzisothiazole 1,1-dioxide, having a melting point of about 178° C. after recrystallization from dilute ethanol. Yield: 22 g. recryst. (63 percent of theory).

*Analysis.*—Calcd.: C, 47.85; H, 3.72; N, 11.96. Found: C, 47.60; H, 3.75; N, 11.81.

Following the same procedure as described in Example 2, the following compounds were prepared:

3 - (2 - p - bromobenzenesulfonylhydrazino)-1,2-benzisothiazole 1,1-dioxide. Melting point: 210° C.

*Analysis.*—Calcd.: C, 37.51; H, 2.42; N, 10.09. Found: C, 39.68; H, 3.52; N, 9.70.

3 - (2 - p - nitrobenzenesulfonylhydrazino)-1,2-benzisothiazole 1,1-dioxide. Melting point: 237° C. (dec.)

*Analysis.*—Calcd.: C, 40.83; H, 2.63; N, 14.65. Found: C, 41.19; H, 2.82; N, 14.78.

3 - (2 - [3,4 - dichlorobenzenesulfonyl)hydrazino]-1,2-benzisothiazole 1,1-dioxide. Melting point: 222° C.

*Analysis.*—Calcd.: C, 38.43; H, 2.23; N, 10.34. Found: C, 38.85; H, 2.21; N, 10.73.

3 - [2 - (2 - naphthalenesulfonyl)hydrazino]1,2-benzisothiazole 1,1-dioxide. Melting point: 2110 C. (dec.)

*Analysis.*—Calcd.: C, 52.70; H, 3.38; N, 10.85. Found: C, 52.78; H, 3.69; N, 11.12.

6 - chloro - 3 - (2 - benzenesulfonylhydrazino)-1,2-benzisothiazole 1,1-dioxide. Melting point: 125° C.

*Analysis.*—Calcd.: C, 41.99; H, 2.71; N, 11.30. Found: C, 41.45; H, 2.99; N, 11.04.

EXAMPLE 3

*3-[2-allyl-2-(benzenesulfonyl)hydrazino]-1,2-benzisothiazole 1,1-dioxide*

To a stirred solution of 17 g. (0.05 mole) of 3-(2-benzenesulfonylhydrazino)-1,2-benzisothiazole 1,1-dioxide, 2 g. (0.05 mole) of sodium hydroxide and 500 ml. of water were added 12 g. (0.10 mole) of allyl bromide, and the mixture was heated and stirred at 70° C. for about 3 hours. The unreacted allyl bromide was evaporated from the reaction product mixture at atmospheric pressure on a steam bath, and the aqueous residual mixture was cooled and acidified with 10 percent aqueous HCl. The solid which precipitated was filtered off, washed with water, and recrystallized from dilute ethanol to yield 3-[2 - allyl - 2-(benzenesulfonyl)hydrazino]1,2-benzisothiazole 1,1-dioxide as the ethanol solvate having a melting point of about 116–120° C. Yield: 8.5 g. (45 percent of theory).

*Analysis.*—Calcd.: C, 51.04; H, 5.00; N, 9.92; S, 15.14. Found: C, 50.97; H, 5.00; N, 9.82; S, 15.08.

Following the same procedure as described in Example 3, the following compound was prepared:

3 - [2 - methyl - 2-(p-toluenesulfonyl)hydrazino]-1,2-benzisothiazole 1,1-dioxide. Melting point: 200° C.

*Analysis.*—Calcd.: C, 49.30; H, 4.14; N, 11.50. Found: C, 49.46; H, 4.44; N, 11.71.

EXAMPLE 4

*3-[2-methyl-2-(benzenesulfonyl)hydrazino-1,2-benzisothiazole 1,1-dioxide*

To a solution composed of 17.5 g. (0.05 mole) of 3-(2 - benzenesulfonylhydrazino) - 1,2-benzisothiazole 1,1-dioxide, 2 g. (0.05 mole) of sodium hydroxide, and 500 ml. of water were added rapidly with stirring 6.3 g. (0.05 mole) of dimethyl sulfate. Stirring was continued for one-half hour followed by the addition of 1 g. of sodium hydroxide and 3.2 g. of dimethyl sulfate. The reaction product mixture was allowed to stand overnight. The reaction product mixture was acidified with dilute aqueous hydrochloric acid and the solid product which separated was filtered off, washed with water, and recrystallized from dilute aqueous ethanol to yield 3-[2-methyl-2-(benzenesulfonyl)hydrazino] - 1,2 - benzisothiazole, 1,1-dioxide. Melting point, dec. >230° C. Yield: 11 g. (62.75 percent).

*Analysis.*—Calcd.: C, 47.85; H, 3.73; N, 11.96. Found: C, 48.00; H, 3.91; N, 12.10.

EXAMPLE 5

*3-(2-methylsulfonylhydrazino)-1,2-benzisothiazole 1,1-dioxide*

A mixture of 100 g. (0.0508 mole) of 3-hydrazino-1,2-benziosothiazole 1,1-dioxide, 5.7 (0.05 mole) of methanesulfonyl chloride, and 5.0 g. (0.05 mole) of triethylamine was heated on the steam bath for about one hour. The reaction product mixture was cooled to about room temperature, evaporated to dryness, and the residue suspended in water. The insoluble material was filtered off and recrystallized from ethanol to yield 3-(2-methylsulfonylhydrazino)-1,2-benzisothiazole 1,1-dioxide having a melting point of about 272° C. Yield: 4 g. (29 percent of theory).

*Analysis.*—Calcd.: C, 34.91; H, 3.29; N, 15.26. Found: C, 34.90; H, 3.35; N, 15.40.

Following the same procedure as in Example 5, the following compound was prepared:

6 - chloro - 3-(2-methylsulfonylhydrazino)-1,2-benzisothiazole 1,1-dioxide. Melting point: 270° C.

*Analysis.*—Calcd.: C, 31.02; H, 2.60; N, 13.56. Found: C, 31.71; H, 2.98; N, 13.21.

We claim:
1. The compounds of the following formula:

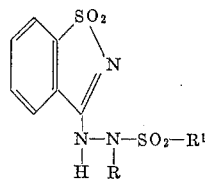

wherein

R is hydrogen, lower alkyl, or lower alkenyl; and
R¹ is lower alkyl, phenyl, or naphthyl.

2. 3 - (2-benzenesulfonylhydrazino)1,2-benzisothiazole 1,1-dioxide.
3. 3 - [2 - methyl-2-(p-toluenesulfonyl)hydrazino]-1,2-benzisothiazole 1,1-dioxide.
4. 3 - [2-allyl-2-(benzenesulfonyl)hydrazino]-1,2-benzisothiazole 1,1-dioxide.
5. 3 - (2 - p-bromobenzenesulfonylhydrazino)-1,2-benzisothiazole 1,1-dioxide.
6. 6 - chloro - 3-(2-methylsulfonylhydrazino)-1,2-benzisothiazole 1,1-dioxide.

No references cited.

HENRY R. JILES, *Primary Examiner.*
ALTON D. ROLLINS, *Assistant Examiner.*